Oct. 22, 1946.   R. B. LONGMATE   2,409,982
LIQUID METERING APPARATUS
Filed Dec. 13, 1943   3 Sheets-Sheet 1
Fig. I
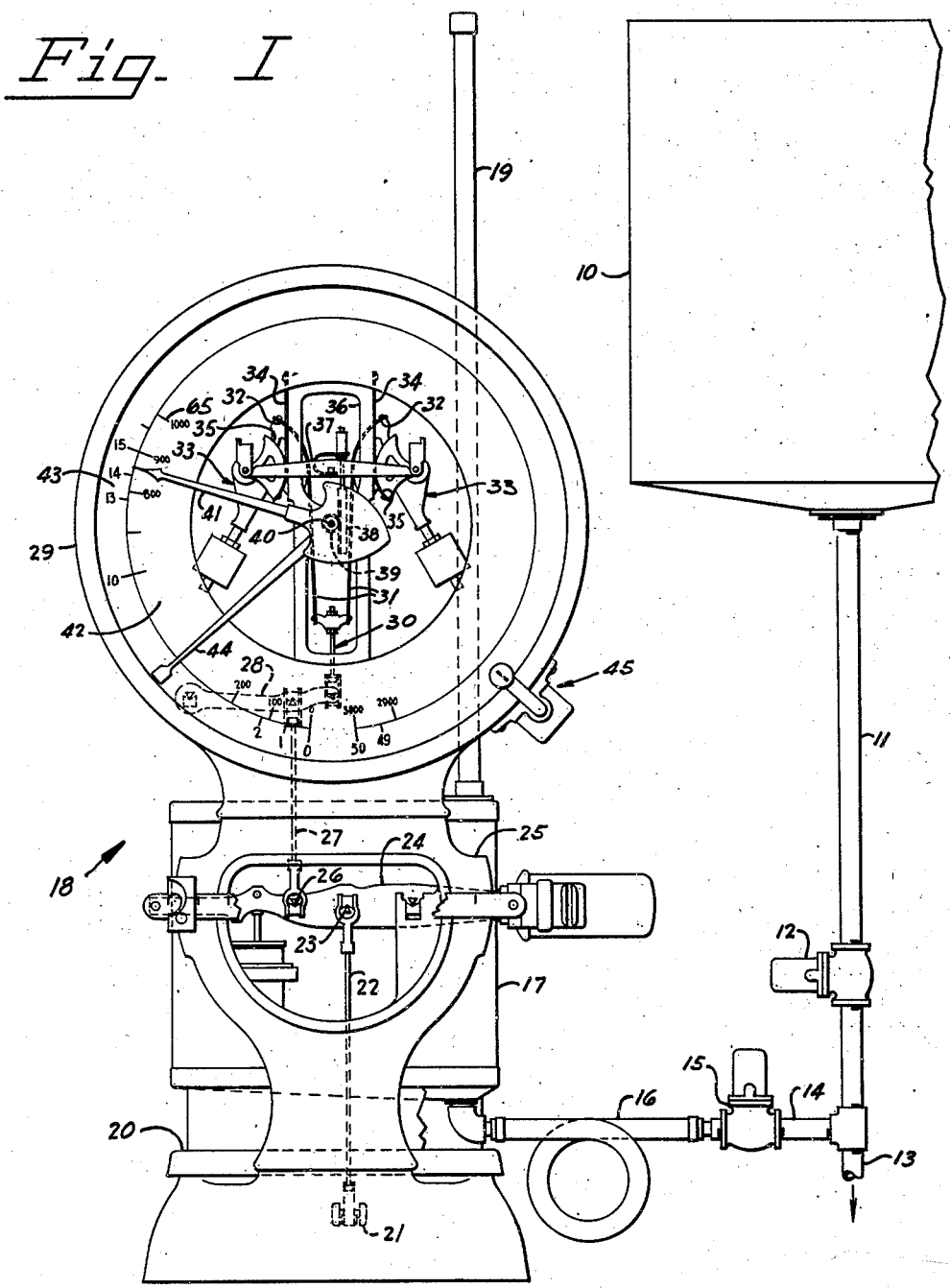
INVENTOR.
Ralph B. Longmate
BY
Marshall and Marshall
ATTORNEYS

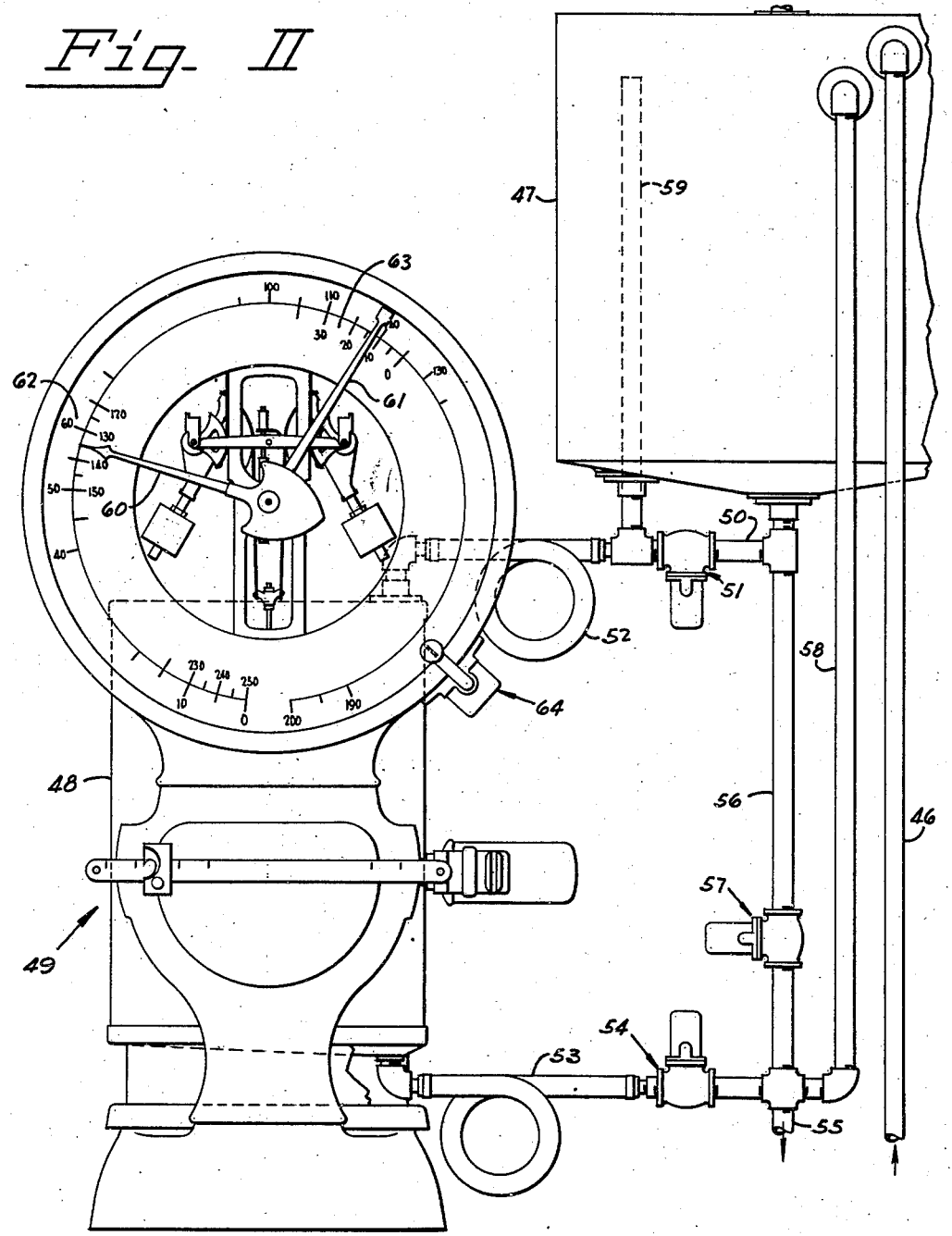

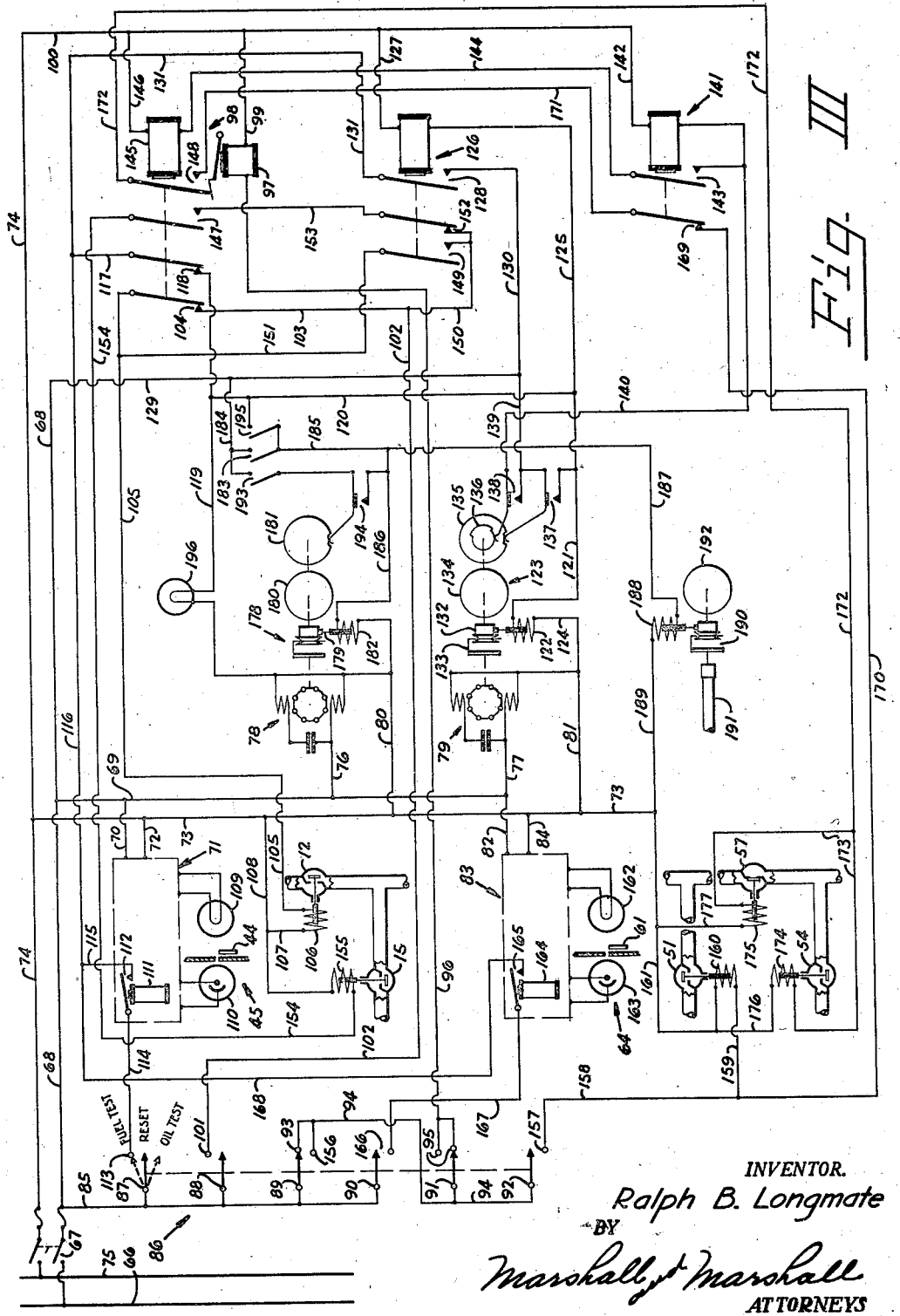

Patented Oct. 22, 1946

2,409,982

UNITED STATES PATENT OFFICE 2,409,982

LIQUID METERING APPARATUS

Ralph B. Longmate, Detroit, Mich., assignor to Toledo Scale Company, Toledo, Ohio, a corporation of New Jersey Application December 13, 1943, Serial No. 514,006

8 Claims. (Cl. 73—113)

This invention relates to apparatus for measuring the flow of liquids and in particular to apparatus adapted to measure the rate of flow of gasoline and lubricating oil during the testing of an internal combustion engine.

One commonly accepted method of measuring the rate of fuel consumption of an internal combustion engine is to mount a fuel tank on a weighing scale, to provide means to keep the tank filled with fuel while supplying fuel to the engine from the tank on the scale, and then making the flow rate determinations by interrupting the fuel supply to the tank and measuring the time interval required for the engine to withdraw a given weight of fuel from the tank. This system, while quite accurate, suffers from the disadvantage that the operator must know the approximate rate of fuel consumption in order that he may properly select a quantity of fuel to be weighed which will provide a suitable timing interval. It has been found necessary, in order to obtain reproducible results, that the time interval must exceed one minute. It is also ordinarily inconvenient to allow the test to run for more than two or two and one-half minutes. Another disadvantage of this method is that the results obtained require computation before the actual consumption in pounds per minute or pounds per hour can be obtained.

A similar system is ordinarily used to measure the circulation rate and the consumption of the lubricating oil. The equipment, in this case, consists of a tank mounted on a weighing scale, and a trap tank mounted on a frame work and located substantially directly above the tank on the scale, and piping to lead the oil scavenged from the engine through suitable cooling coils and into the trap tank. From the trap tank the oil flows into the tank on the scale and from this tank it is pumped back to the engine. The rate of circulation of lubricating oil is determined by interrupting the oil flow from the trap tank to the weigh tank and measuring the time interval required for a definite weight of oil to flow from the weigh tank. This system also requires computation to reduce the observed data to a usable form.

It is the object of this invention to provide apparatus to measure the rate of flow of liquid by weight and give the indications directly in terms of pounds per minute or pounds per hour.

It is another object of the invention to provide apparatus for measuring the circulation rate and the consumption of lubricating oil during the test of an internal combustion engine.

More specific objects and advantages are apparent from the description, in which reference is had to the accompanying drawings illustrating a preferred form of the invention.

Figure I is an elevation showing the general arrangement of a supply tank, a weigh tank mounted on a scale and the connecting piping and valves suitable for use in measuring the fuel consumption of internal combustion engines.

Figure II is an elevation showing a scale, tanks, and piping suitable for use in determining the circulation rate and the consumption of lubricating oil during the test of an internal combustion engine.

Figure III is a schematic diagram showing the electric equipment and connections suitable for operating the equipment illustrated in Figures I and II.

These specific drawings and the description that follows merely disclose and illustrate the invention and are not intended to impose limitations upon the claims.

The equipment for measuring the rate of fuel consumption for an internal combustion engine comprises a supply tank 10 which is equipped with a float valve (not shown) to maintain a definite level of fuel in the tank. The fuel flows from the tank 10 through a pipe 11, an electrically controlled valve 12, and a pipe 13 to the engine. Fuel also flows from the pipe 13 through a branch pipe 14, another electrically controlled valve 15 and a flexible connection 16 to a tank 17 mounted on a scale 18. The tank 17 is made airtight and is provided with a vent pipe 19 the top end of which is higher than the level of the fuel in the tank 10. Thus with the valves 12 and 15 open the tank 17 is filled with fuel which rises in the vent pipe 19 to approximately the same level as the fuel in the tank 10.

The force created by the weight of the tank 17 resting on a platform 20 of the scale 18 is transmitted through a lever system (not shown) within the base of the scale to a noseiron 21 pivotally connected by a steelyard rod 22 to the load pivot 23 of a tare beam lever 24 which is pivotally mounted within an enlarged section of a column 25. The tare beam lever 24 is provided with a power pivot 26 which transmits force through a connection 27 to a pendulum lever 28 pivoted within a substantially watchcase-shaped housing 29 surmounting the column 25. The pendulum lever 28 is pivotally connected by means of a stirrup and yoke assembly 30 to two flexible metallic ribbons 31 whose upper ends overlie arcuate portions 32 of a pair of pendulum bodies 33. The pendulum bodies 33 are supported by means of other flexible metallic ribbons 34 which overlie other arcuate surfaces 35 of the pendulum bodies 33. The upper ends of the supporting ribbons 34 are anchored to the sides of a substantially rectangular frame 36 mounted within the housing 29.

Motion of the pendulum bodies 33 when counterbalancing a load is transmitted through compensating bars 37 and a rack 38 to a pinion 39 mounted on an indicator shaft 40 rotatably journaled in the rectangular frame 36. The indicator shaft 40 carries an indicator 41 adapted to sweep over an annular chart 42 bearing indicia 43.

The connection from the pendulum bodies 33 to the indicator 41 is so arranged that the indicator 41 rotates clockwise with decrease in load on the platform 29. The indicia 43 also extending clockwise thus indicate the weight of fuel removed from the scale. The scale is so balanced that with the tank 17 filled the indicator is behind zero, i. e. fuel must be removed from the tank to bring the indicator to zero.

For the purpose of initiating the operation of auxiliary control mechanism a second indicator 44 is also mounted on the indicator shaft 40. The indicator 44 cooperates with a photoswitch 45 mounted through the side of the housing 29 to give an electrical indication when the indicator 41 passes the zero indicium as fuel is withdrawn from the scale.

A somewhat similar arrangement suitable for use in measuring both the consumption and the rate of circulation of lubricating oil for an engine under test is illustrated in Figure II. Lubricating oil from the engine after passing through cooling coils is returned through a pipe 46 to a trap tank 47 supported by a rigid frame work (not shown) in a position adjacent to and slightly higher than a weigh tank 48. The weigh tank 48 is supported on a scale 49 which is similar to the scale 18 except that the indicator is arranged to rotate clockwise with an increase in load. Oil from the tank 47 flows through a pipe 50, an electrically controlled valve 51, and a flexible connection 52 to the weigh tank 48. From the tank 48 the oil flows through another flexible connection 53, another electrically controlled valve 54, and a pipe 55 leading to the engine. The pipes 50 and 55 are connected by a by-pass pipe 56 including another electrically controlled valve 57 which is normally closed. In normal operation the valves 51 and 54 are normally open and the oil is drained from the weigh tank 48 as required by the engine. The return oil flows into the tank 47 and immediately drains through the valve 51 back into the weigh tank 48. Thus the change in weight of the weigh tank 48 is a measure of the amount of oil actually consumed by the engine.

The circulation rate measurements are made by closing the valve 51, thereby interrupting the return of oil to the weigh tank 48 so that its weight decreases at the rate that the oil circulates through the engine. The return oil, of course, collects in the tank 47. At the end of a predetermined definite time interval, the valve 54 is also closed and the valve 57 opened to allow the oil to flow through the by-pass from the trap tank 47 to the engine. The decrease in weight of the weigh tank 48 during the known time interval is a measure of the rate of circulation. The sizes of the tanks 47 and 48 are so proportioned that the oil level rises in the tank 47 above the level of an overflow 58 before the weigh tank 48 is completely drained. Thus if for some reason the valve 51 should be maintained closed the circulation of oil for the engine will not be interrupted. Another pipe 59 connects the flexible connection 52 to the upper part of the trap tank 47 and thus acting with the flexible connection 52 serves as a vent for the weigh tank 48.

The scale 49 is equipped with two indicators 60 and 61. The indicator 60 cooperates with a series of indicia 62 to indicate the quantity of oil in the tank 48 and with a second set of indicia 63 running counter to the indicia 62 and occupying approximately the lower two thirds of the chart space to indicate the weight decrease when making a circulation rate test. The indicator 61 is arranged to actuate a photoswitch 64 when the indicator 60 passes the zero indicium of the series of indicia 63.

In normal operation sufficient oil is supplied to fill the engine system and to keep the weight of the weigh tank 48 great enough so that the indicator 60 rests beyond the series of indicia 63.

The electrical control for operating the weighing systems shown in Figures I and II is shown schematically in Figure III. This equipment comprises the two photoswitches 45 and 64, a chronometer and a control timer, a manually operable selector switch, and other miscellaneous elements. Briefly, the operation of this equipment is: With a selector switch in its normal position, fuel from a tank 10 is allowed to flow to the engine and also into the weigh tank 17. Then when the selector switch is thrown to its "Fuel test" position the flow from the supply tank 10 is interrupted and the engine is supplied from the weigh tank 17. As the indicator 41 passes the zero indicium the photoswitch 45 starts a timer which is set to run for one minute. At the end of the minute the electrical control closes the valve 15 and opens the valve 12 thereby stopping the withdrawal of fuel from the tank 17 without interrupting the supply to the engine. The amount of fuel withdrawn from the scale is indicated on the chart 42 and may be interpreted as being pounds per minute since the fuel was withdrawn during one minute. If desired, an additional series of indicia 65 having values sixty times as great may be included on the chart 42 to indicate pounds per hour. After the reading is taken and the selector switch returned to its normal position the valve 15 is again opened and the fuel tank 17 refilled.

The oil weighing system shown in Figure II operates on the same principle except that the time interval is one half minute instead of one minute.

The electrical control for accomplishing this type of operation is schematically illustrated in Figure III. Electrical current from one lead 66 of a source of power flows through a disconnect switch 67, leads 68, 69 and 70 to the amplifier 71 of the photoswitch 45 and from the amplifier 71 returns through leads 72, 73, and 74 to the disconnect switch 67 and the other lead 75 of the power source. From the lead 69 current is supplied through leads 76, and 77 to two synchronous motors 78 and 79 and from them returns through leads 80 and 81 to the return lead 73. Current is also supplied through the lead 69 and a lead 82 to another amplifier 83 associated with the photoswitch 64 and returned from the amplifier 83 through a lead 84 to the return lead 73. The amplifiers 71 and 83 and the synchronous motors 78 and 79 are thus energized as long as the disconnect switch 67 is closed. Current is also supplied from the lead 68 through a lead 85 to four sections of a six-section three-position selector switch 86 comprising sections 87, 88, 89, 90, 91, and 92.

When the selector switch is returned to its central or "Reset" position after a previous test current flows from the lead 85 through contacts 93 of section 89, lead 94, contacts 95 of section 91, through a lead 96, a release coil 97 of a latch relay 98, and leads 99 and 100 to the return lead 74. This releases the latch relay 98 and returns all the valves to their de-energized or normal position.

When it is desired to make a fuel consumption rate test the selector switch 86 is thrown to "Fuel test" position. Current then flows from the lead 85 through contacts 101 of selector switch section 88, leads 102, 103, normally closed contacts 104 of the latch relay 98, a lead 105, the solenoid coil 106 of the valve 12, and leads 107 and 108 to the return lead 73. This closes the valve 12 thereby cutting off the flow of fuel from the supply tank 10 to the engine. As fuel is withdrawn from the weigh tank 17 the indicator 44 interrupts the light from a light source 109 to a photocell 110 included in the photoswitch 45 which causes an associated relay 111 to close its contacts 112. Current then flows from the lead 85 through contacts 113 of section 87 of the selector switch 86, a lead 114, the now closed contacts 112, leads 115, 116, 117, normally closed contacts 118 of the latch relay 98, leads 119, 120, and 121 to a brake solenoid 122 of a control timer 123 and from the timer through a lead 124 and the lead 81 to the return lead 73. Current from the lead 120 which is supplied through the relay contacts 112 and the latch relay contacts 118 flows through a lead 125, the coil of the relay 126, and leads 127 and 100 to the return lead 74. Relay 126 then closes its contacts 128 to allow current to flow from the lead 68 through leads 129 and 130, the now closed contacts 128, and lead 131 to the lead 116 thereby completing a shunt circuit around the contacts 112. This energizes the relay 126 independently of the photoswitch 45 allowing it to open its contacts 112 without stopping the cycle of operations. The energization of the brake solenoid 122 releases the driven member 132 of a friction clutch 133 to allow the synchronous motor 79 to drive the control timer 123 which includes a gear reduction 134 and cams 135 and 136. The cams 135 and 136 operate contacts 137 and 138 respectively. The cams 135 and 136 are arranged to hold their respective contacts closed for exactly one minute and for one half minute respectively from the time the brake solenoid 122 is energized. The closure of the contacts 138, which occurs after the contacts 137 have been closed, allows current to flow from the lead 68 through the lead 129, a lead 139, the contacts 138, a lead 140, the coil of a relay 141, a lead 142 and the lead 100 to the return lead 74. This energizes the relay 141 causing it to close its contacts 143 thereby allowing current to flow from the lead 140 through the contacts 143, a lead 144, the closing coil 145 of the latch relay 98, and a lead 146 to the return lead 74. This operates the latch relay 98 to open its contacts 104 and 118 and close its contacts 147 and 148. The opening of the contact 104 does not de-energize the solenoid 106 which operates the valve 12 because a parallel circuit from the lead 102 through contacts 149 of the relay 126 has been completed so that current may flow from the lead 102 through a lead 150, the contacts 149, and a lead 151 to the lead 105 which is connected to the valve solenoid 106.

At the expiration of the half minute the contacts 138 are opened and the relay 141 is de-energized, while the relay 98 remains in its latched position. The opening of the contacts 137 at the expiration of the one minute time interval de-energizes both the brake solenoid 122 and the relay 126 because the circuit through the contacts 118 of the latch relay 98 has been previously opened. De-energization of the relay 126 closes its contacts 152 thereby allowing current to flow from the lead 102 which is supplied through section 88 of the selector switch 86 through the lead 150, the contact 152, a lead 153, the now closed contacts 147, a lead 154, a valve solenoid 155 operating the valve 15, and the lead 108 to the return lead 73. The energization of the solenoid 155 closes the valve 15 thereby preventing any further withdrawal of fuel from the weigh tank 17. The de-energization of the relay 126 also opened its contacts 149 through which current was flowing to the solenoid 106 controlling the valve 12 thus allowing the valve 12 to open to supply fuel to the engine. Because exactly one minute elapsed from the time that the indicator stood at zero until the withdrawal of fuel from the tank 17 was terminated the weight withdrawn is equivalent to the rate of flow in pounds per minute and the scale can be read accordingly.

After the operator has noted the indication, he returns the selector switch to the "Reset" position thus completing the circuit through sections 89 and 91 of the selector switch 86 to the latch release coil 97 of the latch relay 98. The latch relay thereupon opens its contact 147 thus de-energizing the solenoid 155 to open the valve 15 thereby allowing the weigh tank to refill.

The consumption of lubricating oil is determined by observing the decrease in weight of the oil weigh tank 48 during the progress of an engine test. This is predicated upon the assumption that the amount of oil in the engine and in the cooling coils and pipes remains constant and that the loss of oil is reflected in the change of weight of the tank on the scale. The rate of circulation of lubricating oil is determined in a manner quite similar to the method just described in connection with fuel measurements.

When the operator desires to make a measurement of the circulation rate he turns the selector switch 86 to the "Oil Test" position. Current then flows from the lead 85 through the contacts 156 of selector switch section 89 and lead 94 to section 92, through its contacts 157, leads 158 and 159, a solenoid 160 and through a lead 161 to the return lead 73. The solenoid 160 closes the valve 51 thereby preventing the draining of oil from the trap tank 47 to the weigh tank 48. As the weight of the tank 48 decreases and the indicator 60 passes the zero indicium of the series of indicia 63 the indicator 61 interrupts the light from a light source 162 to a photocell 163 incorporated in the photoswitch 64 thereby causing an associated relay 164 to close its contacts 165. Current then flows from the selector switch section 90 through its contacts 166, a lead 167, the now closed contacts 165, and a lead 168 to the lead 116 and from it through the lead 117, contacts 118, leads 120, 121, the brake solenoid 122, and then through leads 124 and 81 to the return lead 73. Current also flows at this time from the lead 120 through lead 125 into the coil of the relay 126. The control timer now operates and closes the contacts 137 and 138 in the order mentioned. The closure of the contacts 138 allows current to flow from lead 68 through leads 129 and 139, contacts 138, lead 140, the coil of the relay 141, and leads 142 and 100 to the return lead 74. Relay 141 thereupon closes its contacts 143 and current flows from the lead 140 through the contacts 143, the lead 144, and the closing coil 145 of the latch relay 98. This energizes the latch relay and it closes its contacts 147 and 148 and opens its contacts 104 and 118. Opening the contacts 118 leaves the relay 126 and the brake solenoid energized solely through the cam controlled contacts 137. At the expiration of one-half minute from the time that the indicator 61 interrupted the light to the photocell 163, the contacts 138 are opened and the relay 141 is released and closes its contacts 169. Current may then flow from section 92 of the selector switch 86 through contacts 157, leads 158 and 170, the now closed contacts 169, a lead 171, now closed contacts 148 of the latch relay 98, lead 172, parallel leads 173, the solenoids 174 and 175 which control the valves 54 and 57 respectively, and then through leads 176 and 177 and lead 161 to the return lead 73. The valve 54 interrupts the flow of oil from the weigh tank 48 while the valve 57 establishes flow to the engine from the trap tank 47 through the by-pass 56. Since both the valves 51 and 54 are now closed the scale is maintained at rest and the quantity of oil removed during the half minute is indicated on the series of indicia 63. For convenience the indicia 63 are arranged to indicate pounds per minute even though the test period is one-half minute. The timer continues to run until the minute interval is completed at which time, by opening the contacts 137, it de-energizes itself and the relay 126. After the operator notes the reading he returns the selector switch to "Reset" which in turn energizes the latch release coil 97 to unlatch the relay 98. The opening of the contacts 157 of section 92 of the selector switch de-energizes the solenoids operating the valves to return them to their normal positions.

A timer and revolution counter may be very conveniently added and are shown in Figure III. The timer employs a friction clutch 178 which is controlled by a brake 179 to transmit motion from the synchronous motor 78 to the clockwork 180 and the cam 181. The clockwork runs as long as the solenoid 182 controlling the clutch 178 is energized. Thus if it is desired to measure a particular interval of time a switch 183 is closed to allow current to flow from the lead 68 through the lead 129, a lead 184, the switch 183, leads 185 and 186, the solenoid 182 and the lead 80 to the return lead 73. The clockwork 180 runs during the time the switch is closed. When the switch 183 is closed current also flows through the lead 185, a lead 187, a solenoid 188, and a lead 189 to the return lead 73. The solenoid 188 controls a friction clutch 190, similar to the clutch 178, which connects a shaft 191 which turns at engine speed with a registering counter 192. The counter 192 thus indicates the revolutions completed during the time interval the switch 183 was closed. Another switch 193 is provided and is connected in series with a set of contacts 194 which are controlled by the cam 181 which makes a revolution in one-tenth of a minute. If the switch 193 is closed and the switch 183 is closed momentarily, long enough for the cam 181 to turn far enough to close the contacts 194, the switch 183 may be opened and the timer 180 and the revolution counter 192 will run for exactly one-tenth of a minute. The revolutions completed in this time and indicated by the revolution counter when multiplied by ten will give the speed of the engine in revolutions per minute.

A third switch 195 is also provided to energize the solenoids 182 and 188 and thereby operate the timer and revolution counter during the duration of a fuel or oil circulation rate test. A pilot light 196 is connected between the lead 119 and the lead 89 which is in turn connected to the return lead 73 and is intended to serve as an indication to the operator as to when he may safely start a test or if a test is in operation, the pilot light 196 is on during a fuel test or oil test and during the half minute after an oil circulation test.

This method of measurement gives an accurate indication of rate of flow of liquid, in terms of pounds per minute and is applicable to other measurements of liquid flow besides those specifically disclosed. The apparatus may be varied according to the specific needs without departing from the spirit of the invention.

Having described the invention, I claim:

1. In a device for measuring the rate of flow of liquid, in combination, a supply tank in which a supply of liquid is maintained, a weigh tank, a weighing scale for supporting the weigh tank, piping from the supply tank to a liquid receiving system, a branch pipe to said weigh tank, an electrically controlled normally open valve in the pipe to each tank, said weigh tank being filled from said supply tank when both valves are open, an electrical control system including an interval timer, manually operable means to condition the electrical control system to cause said valve in the pipe from the supply tank to interrupt the flow of liquid from said supply tank, means actuated by the scale to start the timer when the weight of liquid in said weigh tank reaches a predetermined amount, and means actuated by the timer to cause said valves to interrupt the flow from the weigh tank and re-establish flow from the supply tank, said manually operable means being adapted upon return to normal position to cause said electrical control to open said valves and allow flow to the weigh tank in preparation for a succeeding test.

2. In a device for measuring the rate of flow of liquid, in combination, a supply tank in which a supply of the liquid is maintained, a weighing scale, a weigh tank supported by the scale, piping from said supply tank to a liquid receiving system including a branch connection to said weigh tank, electrically controlled valves to control the flow from each of said tanks, electrical means for controlling the valves, manually operable means for conditioning said electrical means to close the valve to said supply tank, an interval timer, means actuated by the scale for starting the timer when the weight of liquid in the weigh tank equals a predetermined amount, said electrical means being controlled by said timer to close the valves to said weigh tank at the termination of the time interval and thus maintain the weight of the weigh tank at that weight reached at the termination of the predetermined time interval.

3. In a device for measuring the rate of flow of liquid, in combination, a supply tank in which a supply of the liquid is maintained, a weigh tank, a weighing scale for supporting the weigh tank, piping from said supply tank to a liquid receiving system including a branch connection to said weigh tank, electrically controlled valves in the connections to the tanks, electrical means for controlling the valves, manually operable means for starting a measurement by conditioning said electrical means to close the valve to said supply tank, an interval timer, means actuated by the scale for starting the timer, said electrical means being conditioned by said timer to allow withdrawal of liquid from the weigh tank for a predetermined time and then close the valve to said weigh tank to maintain the residual liquid in the weigh tank to permit determination of the weight of the amount withdrawn.

4. In a device for measuring the consumption and rate of circulation of lubricating oil during the test of an internal combustion engine, in combination, a trap tank for receiving oil from the engine, a weighing scale, a weigh tank supported on the scale, a piping system to lead oil returned from the engine to the trap tank, from the trap tank to the weigh tank, and from the weigh tank to the engine, electrically controlled valves in the pipes between the trap tank and the weigh tank and between the weigh tank and the engine, a by-pass pipe including an electrically controlled valve connecting the outlet of the trap tank to the pipe to the engine, a manually conditioned electrical control system for controlling said valves, an interval timer, means actuated by the scale when the weight thereon is a specified amount for starting the timer, said electrical control being responsive to manual control to condition the valves to trap oil in the trap tank and allow withdrawal of oil from the weigh tank, said electrical control being responsive to said timer to condition said valves at the termination of a specified time interval to interrupt all flow to or from the weigh tank while supplying the engine through the by-pass.

5. In a device for measuring the consumption and rate of circulation of lubricating oil during the test of an internal combustion engine, in combination, a trap tank for receiving oil from the engine, a weighing scale, a weigh tank supported on the scale, a piping system to lead oil returned from the engine to the trap tank, from the trap tank to the weigh tank, and from the weight tank to the engine, electrically controlled valves in the pipes between the tanks and the weigh tank and the engine, a by-pass pipe including an electrically controlled valve connected between the outlet of the trap tank and the pipe to the engine, an overflow pipe connecting the upper portion of the trap tank to the piping between the engine, a pipe connecting the piping between the weigh tank and the trap tank to the upper portion of the trap tank to serve as a vent for the weigh tank, and electrical means to operate the valves, said electrical means being responsive to manual control to interrupt flow from said trap tank, an interval timer, means on said scale to start said timer, said electrical means being responsive to said timer to allow oil to be drained from the weigh tank for a predetermined time after the weight of the tank has been brought to a definite value and thereafter to condition said valves to prevent flow from or to the weigh tank so the weight loss for the predetermined time may be determined.

6. In a device for measuring the consumption and rate of circulation of lubricating oil during the test of an internal combustion engine, in combination, a trap tank for receiving oil from the engine, a weighing scale, a weigh tank supported on the scale, a piping system to lead oil returned from the engine to the trap tank, from the trap tank to the weigh tank, and from the weigh tank to the engine, electrically controlled valves in the pipes between the tanks and the weigh tank and the engine, a by-pass pipe including an electrically controlled valve connected between the outlet of the trap tank and the pipe to the engine, an overflow pipe connecting the upper portion of the trap tank to the piping to the engine, and electrical means to control the valves, said electrical means being responsive to manual control to interrupt flow into said weigh tank, an interval timer, means on said scale to start said timer, said electrical means being responsive to said timer to allow oil to be drained from the weigh tank for a predetermined time after the weight of the tank has been brought to a definite value and thereafter prevent flow from or to the weigh tank so the weight loss for the predetermined time may be determined.

7. In a device for measuring the consumption and rate of circulation of lubricating oil during the test of an internal combustion engine, in combination, a trap tank for receiving oil from the engine, a weighing scale, a weigh tank supported on the scale, a piping system to lead oil returned from the engine to the trap tank, from the trap tank to the weigh tank, and from the weigh tank to the engine, electrically controlled valves in the pipes between the tanks and the weigh tank and the engine, a by-pass pipe including an electrically controlled valve connected between the outlet of the trap tank and the pipe to the engine, a pipe connecting the piping between the weigh tank and the trap tank to the upper portion of the trap tank to serve as a vent for the weigh tank, and electrical relays to operate the valves, a manual control to condition said relays and associated valves to interrupt flow to said weigh tank, an interval timer, a photoswitch on said scale to start said timer, said relays being responsive to said timer to allow oil to be drained from the weigh tank for a predetermined time after the weight of the tank has been brought to a definite value and thereafter prevent flow from or to the weigh tank so the weight loss for the predetermined time may be determined.

8. In a device for measuring the rate of flow of a liquid, in combination, a supply tank, piping from said supply tank to a liquid receiving system, a weigh tank, a weighing scale supporting said weigh tank, a single connection from said weigh tank to the piping from said supply tank, a valve in the connection to each tank, said weigh tank being disposed at an elevation slightly less than said supply tank so that it fills by gravity therefrom, an interval timer, means on said scale for starting said timer, means for operating said valves, said last named means being responsive to manual control to interrupt flow from said supply tank and responsive to said timer to interrupt flow from said weigh tank and re-establish flow from said supply tank.

RALPH B. LONGMATE.